US006292555B1

(12) United States Patent
Okamoto

(10) Patent No.: US 6,292,555 B1
(45) Date of Patent: *Sep. 18, 2001

(54) SYSTEM, METHOD AND STORAGE MEDIUM FOR CONNECTION TO OPERATOR

(75) Inventor: Yoshiya Okamoto, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,832

(22) Filed: Feb. 27, 1998

(30) Foreign Application Priority Data

Sep. 19, 1997 (JP) .................................................. 9-255497

(51) Int. Cl.⁷ ..................................................... H04M 3/00
(52) U.S. Cl. ........................... 379/265; 379/309; 379/127
(58) Field of Search .................................... 379/265, 266, 379/309, 127

(56) References Cited

U.S. PATENT DOCUMENTS 5,703,943 * 12/1997 Otto ..................................... 379/265

FOREIGN PATENT DOCUMENTS

| 0 768 788 | 4/1997 | (EP) . |
| 2 314 232 | 12/1997 | (GB) . |
| 05165862 A | 7/1993 | (JP) . |

* cited by examiner

*Primary Examiner*—Creighton Smith
(74) *Attorney, Agent, or Firm*—Staas & Halsey LLP

(57) ABSTRACT

An operator connection system in which a telephone call from a customer having ever called is connected to an operator having ever served the particular customer, as far as possible. The operator connection system comprises an exchange for receiving calls from customers, a server for acquiring the calling subscriber number of each of the calls from the exchange through a CTI link, a customer database for storing the information items of the customers and operators therein, a plurality of client computers, and a private network. The server acquires the calling subscriber number of the call of the customer, and searches for the customer information corresponding to the number and the operator having ever served the particular customer. Further, the server searches for a telephone set and the client computer which are allocated to the specified operator, and it commands the exchange to bring the telephone set of the specified operator and that of the particular customer into line connection. Also, it causes the client computer to display the customer information.

15 Claims, 11 Drawing Sheets

131 CUSTOMER MASTER

| CUSTOMER NUMBER | CALLING SUBSCRIBER NUMBER | FAMILY NAME OF CUSTOMER (IN "KANA") | PERSONAL NAME OF CUSTOMER (IN "KANA") | ... |
|---|---|---|---|---|
| 10001 | 03-3778-0001 | ヤマダ (YAMADA) | タカヒサ (TAKAHISA) | ... |
| 10002 | 03-3778-0002 | カトウ (KATOH) | ノブヤ (NOBUYA) | ... |
| ... | ... | ... | ... | ... |

FIG. 5A

132 TRANSACTION TABLE

| CALLING-SUBSCRIBER NUMBER | OPERATOR NUMBER | DATE OF TRANSACTIONS | TIME PERIOD OF TRANSACTIONS (IN MIN.) |
|---|---|---|---|
| 03-3778-0001 | 001 | 97/4/7 | 9 |
| 03-3778-0002 | 002 | 97/4/7 | 13 |
| 03-3778-0001 | 001 | 97/4/8 | 5 |
| 03-3778-0002 | 001 | 97/4/8 | 7 |
| ... | ... | ... | ... |

FIG. 5B

133 FAMILIAR-OPERATOR TABLE

| CALLING SUBSCRIBER NUMBER | FIRST-OPERATOR NUMBER | SECOND-OPERATOR NUMBER | THIRD-OPERATOR NUMBER | FOURTH-OPERATOR NUMBER |
|---|---|---|---|---|
| 03-3778-0001 | 001 | | | |
| 03-3778-0002 | 002 | 001 | | |
| ... | ... | ... | ... | ... |

FIG. 5C

134 OPERATOR MASTER

| OPERATOR NUMBER | NAME OF OPERATOR | TERMINAL NUMBER | EXTENSION NUMBER |
|---|---|---|---|
| 001 | SAEKI | 001 | 1111 |
| 002 | FUJITA | 002 | 2222 |
| ... | ... | ... | ... |

ORDERED COMMODITY INPUT

| | | | |
|---|---|---|---|
| NAME | KEIKO SUZUKI / 鈴木 圭子 | EXISTING | WELCOME CUSTOMER |
| 〒 | 908-12 | TEL 03-3778-8211 | |
| ADDRESS | 1-5-1, 3-CHOME, OH-I, SHINAGAWA-KU, TOKYO | | |
| HISTORY OF PURCHASES | MAY 15, '97: FLARED SKIRT (BLACK) M-SIZE | | |

OPERATOR ID
DATE OF APPLICATION  10/23/1995
10/23/1995  16:25:28

| No. | NUMBER OF SINGLE COMMODITY APPLIED FOR | NUMBER OF ARTICLES | LIST UNIT PRICE | SUBTOTAL AMOUNT | COMMODITY INFORMATION | STOCKS IN OTHER STOREHOUSES | |
|---|---|---|---|---|---|---|---|
| 1 | | | | | | | |
| 2 | | | | | | | |

TOTAL NUMBER OF ARTICLES ☐       TOTAL AMOUNT OF PRICES
                                  SPECIAL DISCOUNT
METHOD OF PAYMENT ☐               TAX AMOUNT
                                  CARRIAGE
                                  AMOUNT ASKED ☐

RECEIVED-ORDER NUMBER  19951023-1-00008     PLACE OF INPUT 001
RESERVATION                                 CONTACT SLIP
APPOINTED DATE FOR DELIVERY

PLEASE ENTER THE NUMBER OF THE SINGLE COMMODITY APPLIED FOR

| REGISTRATION [F1] | CUSTOMER [F2] | PAYMENT [F3] | COMMENT [F4] | CONSIGNEE [F5] | CONDITIONS [F6] | COLOR/SIZE [F7] | SUBSTITUTION [F8] | GUIDE [F9] | COMPULSION [F10] |

LIST OF CUSTOMERS (FD0B0112)

SEARCH KEY: 03-3778-8211

| NAME IN "KANJI" | NAME IN "KANA" | DISTINCTION | TEL | ADDRESS |
|---|---|---|---|---|
| 鈴木 二郎 | スズキ ジロウ (JIROH SUZUKI) | REPRESENTATIVE | 03-3778-8211 | 1-5-1, 3-CHOME, OH-I, SHINAGAWA-KU |
| 鈴木 圭子 | スズキ ケイコ (KEIKO SUZUKI) | FAMILY MEMBER | 03-3778-8211 | 1-5-1, 3-CHOME, OH-I, SHINAGAWA-KU |

PLEASE SELECT THE CUSTOMER INFORMATION WITH THE KEY [↑] OR [↓], AND PRESS THE KEY [ENTER].

CANCEL [ESC]　　NO PERTINENT INFORMATION [F12]

FIG. 8

IN DATA #1 | CALLING-SUBSCRIBER-NUMBER | FIG. 9A

OUT DATA | EXTENSION NUMBER | FIG. 9B

IN DATA #2 | CONNECTED EXTENSION NUMBER | FIG. 9C

SYSTEM, METHOD AND STORAGE MEDIUM FOR CONNECTION TO OPERATOR

BACKGROUND OF THE INVENTION

1. Field of the Invention

The present invention relates to a system wherein a telephone call from a customer is automatically connected to an operator. More particularly, it relates to a system and a method in which, when a call from a customer has been received, calling-subscriber information on the calling customer is acquired using the CTI (Computer Telephony Integration) facility, and in which, using the calling-subscriber information, a database is searched for an operator having ever served the specific customer, so as to automatically connect the customer's call to a telephone set allocated to the specific operator. It relates also to a storage medium which stores therein a program for implementing such automatic connection.

2. Description of the Related Art

Nowadays, there are a large number of services wherein telephone calls from many and unspecified customers are received so as to take proper measures complying with the customers' needs, such as mail-order sale, a credit service, a service for consulting about products, and a telephone call center. (Here in this specification, all kinds of users, including the users of services in each of which a charge or a substantial equivalent is not involved, shall be termed "customers".) In such services, persons termed "operators" serve the calls received from the customers, respectively. In recent years, automatic response systems have been introduced for offering parts of the services instead of the operators (persons). An example of the systems is a computerized automatic response system intended to improve efficiency, wherein information items are communicated as substitutes for the operators or wherein, before the operators respond, the customers' calls are distributed to sections appropriate for the service contents of the calls, in accordance with inputs entered by the customers after the calls have been received.

Such a system is really suited to communicate information items to the customers unidirectionally in case of, e.g., the notice of the prices of products or the presentation of the specifications of products. Finally, however, the operators must deal with the services of the mail-order sale, the credit service, the service for consulting about products, and the telephone call center as mentioned before, each of which is difficult to be dealt with in "reference manual" fashion or each of which requires delicate dealings.

There has also been introduced an operator connection system wherein, in the situation stated before, the customer's call the service content of which requires the operator's response is automatically connected to the operator. The operator connection system in the prior art operates as follows. When the telephone call from the customer has come in, the telephone number of the customer being a calling source is acquired in a telephone exchange, and it is sent to a computer by the CTI facility.

This CTI facility contains an interface function which, when the telephone exchange has received the customer's call, notifies the computer of the acquired information of the customer side, such as the telephone number, and an interface function which, when the computer requests the telephone exchange to report a line connection or a line connection situation, sends a command therefor to the telephone exchange.

Besides, as disclosed in the official gazette of Japanese Laid-open Patent Publication (Tokkaihei) No. 05-165862 (entitled "Customer-Information Registration Apparatus") filed by the same assignee as that of the present application, the above computer can be so constructed that customer information items such as a name and an address corresponding to the telephone number of the customer are stored in a database. According to the construction, when the telephone call from a customer having called at sometime is to be connected to an operator, the customer information corresponding to the calling customer, a transaction input form containing the customer information, or the like can be displayed on the display screen of the client computer allocated to the particular operator. Thus, the operator can readily refer to the customer information of the customer having ever called. Moreover, in entering the inputs (transaction inputs) of an order or the like, such customer information need not be entered each time. These facts lighten a burden on the operator, and improve the efficiency of the dealings with the customer.

Furthermore, the computer can be so constructed that, when the particular operator is to ask for and receive instructions etc. from another veteran or skilled operator, the display of the customer information, the transaction input form containing the customer information, or the like as presented to the particular operator can be collectively transferred to a display device allocated to the veteran or the skilled operator.

Here, the schematic flow of data in the prior-art operator connection system will be explained with reference to FIG. 1.

The operator connection system 1100 illustrated in FIG. 1 is configured of an exchange 1110, a server 1120, a customer database 1130, a network 1140, a plurality of client computers 1150 (1150A, 1150B, . . . ), and a plurality of telephone sets 1160 (1160A, 1160B, . . . ).

The exchange 1110 is connected to a public network 1180, the server 1120 and the plurality of telephone sets 1160 (1160A, 1160B, . . . ). The server 1120 is connected to the exchange 1110 and the customer database 1130. The exchange 1110, the server 1120 and the plurality of client computers 1150 (1150A, 1150B, . . . ) are interconnected through the network 1140.

A customer 1200 gives a telephone call to a predetermined telephone number by the use of his/her telephone set 1190, whereby the telephone set 1190 is connected to the exchange 1110 through the public network 1180. The call given by the customer 1200 is first received by the exchange 1110, in which the calling subscriber number of the customer 1200 is acquired. The calling subscriber number is the telephone number of the telephone set 1190 in the public network 1180 for which the customer 1200 has subscribed. This calling subscriber number is acquirable in the exchange 1110 by the use of, for example, Calling Line Identification Presentation Service for general subscription telephone lines as is experimentally introduced within part of the State of Japan at present by NTT (Nippon Telegraph and Telephone Kabushiki-Kaisha). The service is scheduled to be introduced in all parts of Japan in future, and such services have already been introduced in the United States of America, etc.

The calling subscriber number or the like acquired by the exchange 1110 is obtained from this exchange 1110 through a CTI link 1115 by the server 1120.

Subsequently, on condition that the calling subscriber number obtained by the server 1120 exists in the customer database 1130 (in other words, that the particular customer has ever called to the specific service), customer information items (for example, the address and name of the customer, including the calling subscriber number) which correspond to the calling subscriber number within the customer database 1130 are sent to the display device of the client computers 1150A allocated to one (for example, operator-A 1170A) of operators 1170 (1170A, 1170B, . . . ) who are free or not busy, together with a transaction input form or the like and through the network 1140. Simultaneously, the telephone set 1190 of the customer 1200 and the telephone set-A 1160A of the operator-A 1170A are brought into line connection by the exchange 1110 in compliance with a command issued by the server 1120. As a result, the operator-A 1170A can talk with the customer 1200 while watching the customer information of the customer 1200 and the transaction input form or the like.

The customer information items (the data of the address, name etc.) sent to the client computer 1150A which is allocated to the operator-A 1170A are displayed in the state, for example, in which they have already been entered in the input fields of the transaction input form for the address and the name. In the absence of the correspondent calling subscriber number within the customer database 1130, it is signified that the particular customer is a new one for the specific service which is offered by the system 1100. Accordingly, the customer information items (such as the calling subscriber number, address and name of the customer) need to be registered in the customer database 1130 anew by the manual inputs of, e.g., the operator. Herein, the transaction input form is displayed in the state in which nothing is entered in the input fields for the address and the name.

Now, the processes of the respective functions (1121~1127) of the server 1120 will be explained with reference to FIG. 2.

FIG. 2 illustrates in more detail the server 1120, client computers 1150 and customer database 1130 which are included in the foregoing operator connection system 1100 depicted in FIG. 1. The server 1120 includes the calling-subscriber-number acquisition function 1121, customer-master registration function 1122 (where the word "master" shall signify "master file", and the same shall apply hereinafter), customer-master search function 1123, transaction input function 1124, customer-information creation function 1125, operator connection function 1126 and communication control function (server) 1127. In addition, the customer database 1130 includes a customer master 1131 and a transaction table 1132. Besides, each of the client computers 1150 includes a communication control function (client) 1151, an input device 1152, a display device 1153 and a printer 1154.

First, in the client computer 1150, the communication control function (client) 1151 causes the display device 1153 to present display information sent from the communication control function (server) 1127 of the server 1120. Further, the communication control function (client) 1151 sends the instructions, data inputs etc. of the corresponding one of the operators 1170 (1170A, 1170B, . . . ) as entered through the input device 1152, to the communication control function (server) 1127 of the server 1120. The input device 1152 is typically a keyboard or a mouse, while the display device 1153 may well be a CRT display or the like display device. The printer 1154 may well be a conventional ink-jet printer or laser printer, while each of the telephone sets 1160 may well be a typical one or a headphone type one.

As stated before, the telephone set 1160 is brought into line connection with the telephone set 1190 of the customer 1200 through the exchange 1110 under the control of the server 1120, finally, it can communicate with the telephone set 1190 of the customer 1200 depicted in FIG. 1. Herein, it is also possible to contrive each of the telephone sets 1160 so as to be connected to the exchange 1110 through the corresponding client computer 1150 as well as the server 1120.

The calling-subscriber-number acquisition function 1121 of the server 1120 acquires the calling subscriber number of the customer 1200 from the exchange 1110 through the CTI link 1115 in a case where the exchange 1110 has received the call from the customer 1200.

The customer-master registration function 1122 has the function of registering customer information about the new customer 1200 of the specific service. For example, this function proceeds in such a way that a customer-master registration form is displayed on the display device 1153 of the client computer 1150, and that the corresponding one of the operators 1170 (1170A, 1170B, . . . ) manually enters the necessary information items into the displayed form, whereby the information items are registered as the customer information into the customer master 1131 which is included in the customer database 1130 connected to the server 1120. The decision of the customer 1200 as the new one is rendered in a case where the calling subscriber number acquired by the calling-subscriber-number acquisition function 1121 has not been found within the customer master 1131 in the customer-master search function 1123 to be explained below (that is, in a case where the new customer 1200 utilizes the specific service for the first time).

The customer-master search function 1123 searches the customer master 1131 for the calling subscriber number acquired by the calling-subscriber-number acquisition function 1121. In a case where the customer information items corresponding to the calling subscriber number exist in the customer master 1131, they are edited solely or in the form in which they have already been entered in the input fields of another form such as the transaction input form, and the edited display data are displayed on the display device 1153 of the client computer 1150, by the customer-information creation function 1125 to be explained below.

When the operator 1170 (1170A, 1170B, . . . ) has entered transaction data into the transaction input form displayed on the display device 1153 of the client computer 1150, through the input device 1152 of this client computer 1150, the transaction input function 1124 obtains the transaction data through the communication control function (client) 1151 of the client computer 1150, the network 1140, and the communication control function (server) 1127 of the server 1120, and it executes the check etc. of the transaction data here in the server 1120. Thereafter, the transaction input function 1124 supplements the transaction table 1132 of the customer database 1130 with the contents of the transaction data (that is, information items indicating how the customer 1200 having called has transacted). Although not illustrated in FIG. 2, the operator connection system 1100 can also be contrived so that processes peculiar to the specific service, such as the creations of account data and commodity ordering data, may be automatically executed upon entering the transaction data.

On condition that the customer information items corresponding to the acquired calling subscriber number have been decided to be existent in the customer master 1131 by the customer-master search function 1123, the customer-information creation function 1125 edits the customer information items solely or in the form in which they have already been entered in the input fields of another form such as the transaction input form. In contrast, on condition that the customer information items corresponding to the acquired calling subscriber number have been decided to be nonexistent in the customer master 1131 by the customer-master search function 1123, the transaction input form or the like is edited in the form in which nothing is entered in the input fields of this form. Subsequently, the edited display data are sent through the communication control function (server) 1127, the network 1140 and the communication control function (client) 1151 to, and are indicated on, the display device 1153 of the client computer 1150 allocated to the operator 1170 (for example, the operator-A 1170A) determined so as to serve the current call of the customer 1200 from among the operators 1170 (1170A, 1170B, ... ) who are free or not busy, by the operator connection function 1126 to be explained below.

When the calling-subscriber-number acquisition function 1121 has acquired the calling subscriber number of the customer 1200, the operator connection function 1126 detects the free operators 1170 (1170A, 1170B, ... ) by the CTI facility or any other method, and it commands the exchange 1110 through the CTI link 1115 to connect the call from the customer 1200 to the telephone set 1160 (1160A, 1160B, ... ) of one of the free operators (for example, the operator-A 1170A). That particular one of the free operators 1170 (1170A, 1170B, ... ) to whom the call is to be connected is determined on the basis of a certain criterion, for example, that the frequencies of the receptions of calls by all the operators 1170 (1170A, 1170B, ... ) should be equalized. Also, the connection adjusting function itself can be provided to the exchange 1110.

The communication control function (server) 1127 of the server 1120 sends the display data etc. toward the client computer 1150 as stated before, to the communication control function (client) 1151 of the client computer 1150 through the network 1140. Conversely, the function 1127 of the server 1120 receives data, instructions etc. entered using the input device 1152 of the client computer 1150, from the communication control function (client) 1151 of the client computer 1150 through the network 1140.

As thus far explained, the various contrivances for lightening burdens on operators and for improving the efficiency of dealings are made in the prior-art operator connection system. With such a system, however, a telephone call from a customer who called in the past is not always connected to an operator who served the call in the past. In a case where the call has been connected to a different operator, the problem can occur that the communications between both the customer and the operator do not proceed smoothly. As a result, the customer submits even to the situation that different operators serve his/her respective calls, and he/she might be unfavorably impressed due to the situation. It is consequently apprehended that the customer's desire to positively utilize the specific service will weaken.

Actually, in a service such as mail-order sale, a customer often designates a "familiar" operator who serves the calls of the customer frequently. The prior-art system cannot automatically cope with such needs.

SUMMARY OF THE INVENTION

The present invention has been made in order to solve the problems as stated above, and it has for its object to provide an operator connection system in which, when a telephone call has been received from a customer having ever called, it is automatically connected to an operator having ever served the customer, as far as possible.

A familiar-operator connection system as defined in claim 1 for accomplishing the object of the present invention consists in an operator connection system wherein, for the purpose of offering a predetermined service, telephone calls are received from unspecified customers, and they are respectively connected automatically to telephone sets allocated to operators who offer the service indirectly or directly, comprising calling-subscriber-information acquisition means for acquiring calling subscriber information of the received call of the customer; customer-information storage means for storing therein customer information about said customer as includes at least the calling subscriber information; customer-information registration means for registering the customer information into said customer-information storage means; and decision means for deciding if said calling subscriber information acquired by said calling-subscriber-information acquisition means exists among such customer information stored in said customer-information storage means, when the customer's call has been received. The familiar-operator connection system as defined in claim 1, further comprises serving-history-information storage means for storing therein serving history information each time such customer's call is connected to the telephone set allocated to the operator, the serving history information including at least said calling subscriber information and identification information of said operator to whom the connected telephone set is allocated; and familiar-operator-information storage means for determining identification information of at least one familiar operator every said calling subscriber information at a predetermined timing in accordance with at least one criterion and on the basis of such serving history information stored in said serving-history-information storage means, and for storing therein familiar operator information which includes the identification information of the familiar operator and said calling subscriber information. The familiar-operator connection system as defined in claim 1, further comprises first call connection means for searching such familiar operator information stored in said familiar-operator-information storage means, for said identification information of said at least one familiar operator corresponding to said calling subscriber information of the received customer's call, and for connecting said customer's call to the telephone set allocated to said familiar operator identified by said identification information searched for, in a case where said customer information including said calling subscriber information of said received customer's call has been decided to be existent in said customer-information storage means by said decision means; wherein when the identification information items of at least two familiar operators have been searched for, one of said at least two familiar operators is selected, and the identification information item of the selected familiar operator is used for the call connection. Thus, the call of the customer is connected to the telephone set allocated to the specified operator who has ever served the particular customer, so that the operator can achieve efficient dealings and smooth communications with the customer.

A familiar-operator connection system as defined in claim 2 is so constructed as to further comprise in claim 1, second call connection means for connecting said received customer's call to the telephone set allocated to one of the operators selected in accordance with any desired criterion, in a case where said customer information including said calling subscriber information of said received customer's call has been decided to be nonexistent in said customer-information storage means by said decision means. Thus, the call of the new customer who utilizes the service for the first time is connected to the telephone set allocated to the operator who is selected in accordance with any desired criterion.

A familiar-operator connection system as defined in claim 3 is so constructed as to further comprise in claim 1, first-operator-environment-information storage means for storing therein first operator environment information for each of the operators, the first operator environment information including at least information for identifying the telephone set allocated to the corresponding operator and information for identifying said corresponding operator; wherein said first call connection means connects said received customer's call to said telephone set allocated to said corresponding operator, with reference to such first operator environment information stored in said first-operator-environment-information storage means. Thus, even in case of the movement or the like of the familiar operator, the customer's call can be infallibly connected to the telephone set allocated to the particular familiar operator.

A familiar-operator connection system as defined in claim 4 is so constructed as to further comprise in claim 1, display control means for performing a control so as to display said customer information on a terminal allocated to said operator, in accordance with the connection of said customer's call to said telephone set allocated to said operator. Thus, the familiar operator can watch the customer information in serving the customer, so that he/she can serve the customer more appropriately.

A familiar-operator connection system as defined in claim 5 is so constructed as to further comprise in claim 4, second-operator-environment-information storage means for storing therein second operator environment information for each of the operators, the second operator environment information including at least information for identifying the terminal allocated to the corresponding operator and information for identifying said corresponding operator; wherein said display control means includes sending means for sending said customer information to said terminal allocated to said operator, with reference to such second operator environment information stored in said second-operator-environment-information storage means. Thus, even in case of the movement or the like of the familiar operator, the customer information can be infallibly displayed on the terminal allocated to the particular familiar operator.

A familiar-operator connection system as defined in claim 6 is so constructed in claim 1 that said customer information to be stored in said customer-information storage means is capable of storing information items about a plurality of customers in correspondence with said one calling subscriber information. Thus, in such a case where a plurality of persons utilize the predetermined service by the use of one telephone set (for example, in such a case where the family members of one representative customer utilize the predetermined service), the customer information can be managed every customer who utilizes the specific service.

A familiar-operator connection system as defined in claim 7 is so constructed as to further comprise in claim 1, designation means for optionally designating a criterion in accordance with which said first call connection means selects one of said identification information items of said at least two familiar operators. Thus, the familiar operators can be selected in accordance with different criteria for the respective calling subscriber information items.

A familiar-operator connection system as defined in claim 8 is so constructed as to further comprise in claim 7, setting means for optionally setting the criterion for the selection, every said calling subscriber information. Thus, the familiar operators can be selected in accordance with different criteria for the respective calling subscriber information items.

A familiar-operator connection system as defined in claim 9 is so constructed in claim 1 that the criterion in accordance with which said familiar-operator-information storage means determines said identification information of said at least one familiar operator on the basis of said serving history information stored in said serving-history-information storage means is identification information of the operator who is designated by said customer. Thus, when the customer has given the call, the operator designated by the particular customer can be selected as the familiar operator.

A familiar-operator connection system as defined in claim 10 is so constructed in claim 1 that the criterion in accordance with which said familiar-operator-information storage means determines said identification information of said at least one familiar operator on the basis of said serving history information stored in said serving-history-information storage means is identification information of the operator who has expended the longest time period in serving said customer among said operators. Thus, when the customer has given the call, the operator who has expended the longest time period in serving the particular customer can be selected as the familiar operator.

A familiar-operator connection system as defined in claim 11 is so constructed in claim 1 that the criterion in accordance with which said familiar-operator-information storage means determines said identification information of said at least one familiar operator on the basis of said serving history information stored in said serving-history-information storage means is identification information of the operator who has served said customer the largest number of times among said operators. Thus, when the customer has given the call, the operator who has served the particular customer the largest number of times can be selected as the familiar operator.

A familiar-operator connection system as defined in claim 12 is so constructed in claim 1 that the criterion in accordance with which said familiar-operator-information storage means determines said identification information of said at least one familiar operator on the basis of said serving history information stored in said serving-history-information storage means is identification information of the operator who served said customer last time. Thus, when the customer has given the call, the operator who has served the particular customer last time can be selected as the familiar operator.

A familiar-operator connection system as defined in claim 13 is so constructed in claim 1 that said calling subscriber information is a telephone number of said received customer's call. Thus, the call of the customer is connected to the telephone set allocated to the specified operator who has ever served the particular customer, so that the operators can achieve efficient dealings and smooth communications with the customers.

A familiar-operator connection method as defined in claim 14 consists in an operator connection method wherein, for the purpose of offering a predetermined service, telephone calls are received from unspecified customers, and they are respectively connected automatically to telephone sets allocated to operators who offer the service indirectly or directly, comprising the step of searching for the operator who is familiar to the customer, on the basis of the received call of the particular customer; and the step of connecting the customer's call to the telephone set of the familiar operator.

Thus, the call of the customer is connected to the telephone set allocated to the specified operator who has ever served the particular customer, so that the operators can achieve efficient dealings and smooth communications with the customers.

A storage medium as defined in claim 15 consists in a storage medium storing therein a program for implementing a familiar-operator connection method wherein, for the purpose of offering a predetermined service, telephone calls are received from unspecified customers, and they are respectively connected automatically to telephone sets allocated to operators who offer the service indirectly or directly; the program being a first program which is stored in a computer-readable form and which causes a computer to execute the step of acquiring calling subscriber information of the received call of the customer; the step of storing customer information about said customer in first storage means, the customer information including at least the calling subscriber information; and the step of deciding if the acquired calling subscriber information exists among such customer information stored in the first storage means, when the customer's call has been received. The first program causes the computer to further execute the step of storing serving history information in second storage means each time such customer's call is connected to the telephone set allocated to the operator, the serving history information including at least said calling subscriber information and identification information of said operator to whom the connected telephone set is allocated; and the step of determining identification information of at least one familiar operator every said calling subscriber information at a predetermined timing in accordance with at least one criterion and on the basis of such serving history information stored in the second storage means, in order to set said familiar operator for said customer, and then storing familiar operator information in third storage means, the familiar operator information including the identification information of the familiar operator and said calling subscriber information. The first program causes the computer to still further execute the step of searching such familiar operator information stored in the third storage means, for said identification information of said at least one familiar operator corresponding to said calling subscriber information of the received customer's call, and then connecting said customer's call to the telephone set allocated to said familiar operator identified by said identification information searched for, in a case where said calling subscriber information of said received customer's call has been decided to be existent in said first storage means at the decision step; wherein when the identification information items of at least two familiar operators have been searched for, one of said at least two familiar operators is selected, and the identification information item of the selected familiar operator is used for the call connection. Thus, when the first program is run by the computer, the call of the customer is connected to the telephone set allocated to the specified operator who has ever served the particular customer, so that the operators can achieve efficient dealings and smooth communications with the customers.

A storage medium as defined in claim 16 consists in a storage medium storing therein a program for implementing the familiar-operator connection method, the program being a second program which is stored in the computer-readable form and which causes said computer to execute in addition to the steps included in the first program defined in claim 15, the step of connecting said received customer's call to the telephone set allocated to one of the operators selected in accordance with any desired criterion, in a case where said calling subscriber information of said received customer's call has been decided to be nonexistent in said first storage means at said decision step. Thus, when the second program is run by the computer, the call of the customer is connected to the telephone set allocated to the second operator who has ever served the particular customer, so that the first operator can achieve efficient dealings and smooth communications with the customer different from the particular customer. Moreover, even in a case where the first operator is busy, the call of the particular customer can be connected to the telephone set of the second operator, so that a satisfactory service can be offered to the customers.

BRIEF DESCRIPTION OF THE DRAWINGS

The present invention will be more apparent from the following detailed description when taken in conjunction with the accompanying drawings, in which:

FIG. 5A is a diagram showing the file layout of the customer master of the customer database which is included in the above operator connection system, FIG. 5B is a diagram showing the file layout of the transaction table of the customer database, FIG. 5C is a diagram showing the file layout of the familiar-operator table of the customer database, and FIG. 5D is a diagram showing the file layout of the operator master of the customer database;

FIG. 7 is a diagram showing a transaction input form which is displayed by the client computer by utilizing the above operator connection system;

FIG. 8 is a diagram showing an form for selecting any of customers who have an identical calling subscriber number, the form being displayed by the client computer by utilizing the above operator connection system;

FIGS. 9A, 9B and 9C are diagrams showing "in data" #1, "out data" and "in data" #2, respectively;

DESCRIPTION OF THE PREFERRED EMBODIMENTS

Figure 1:
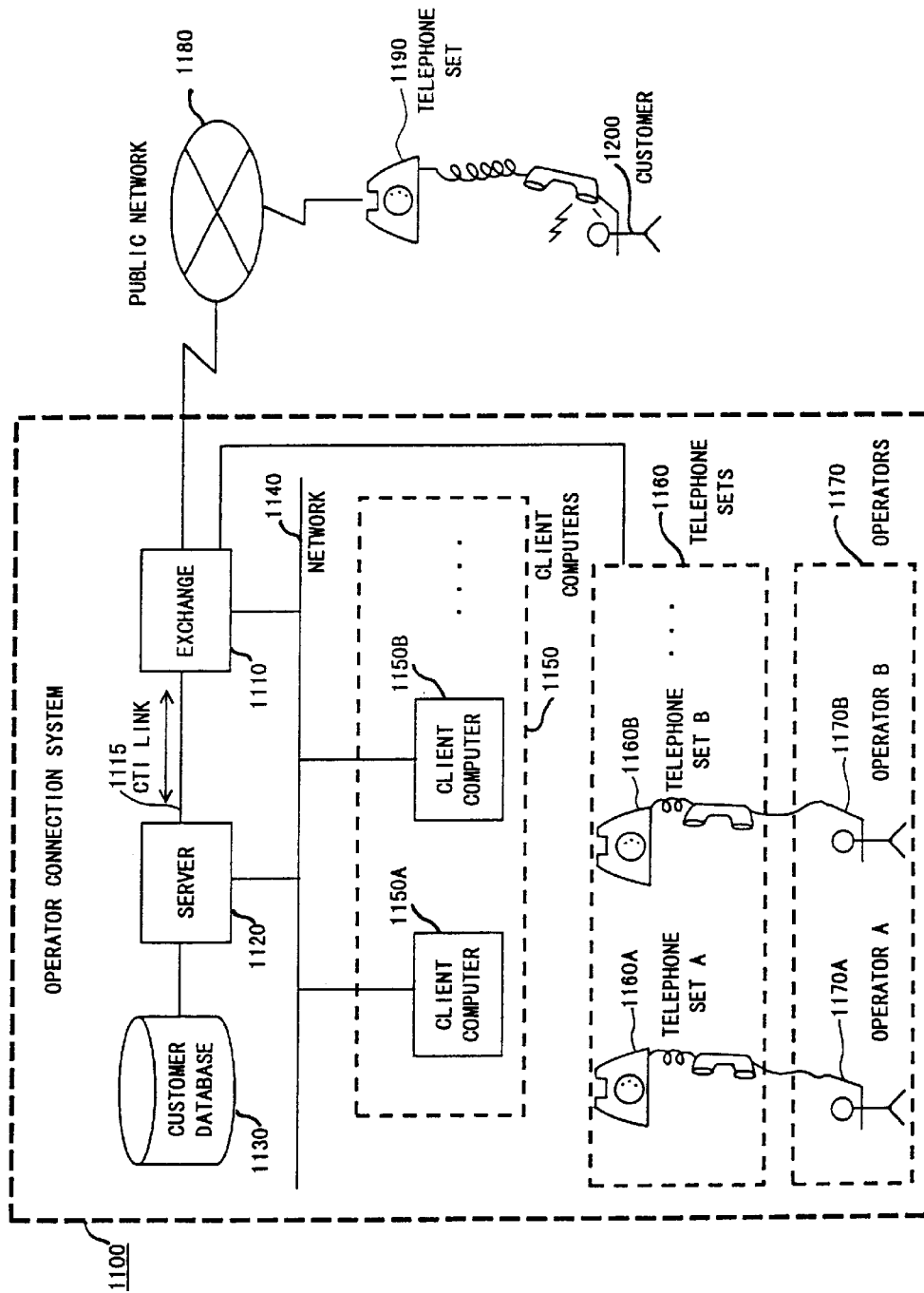
FIG. 1 is a schematic diagram showing the architecture of an operator connection system in the prior art.
Figure 2:
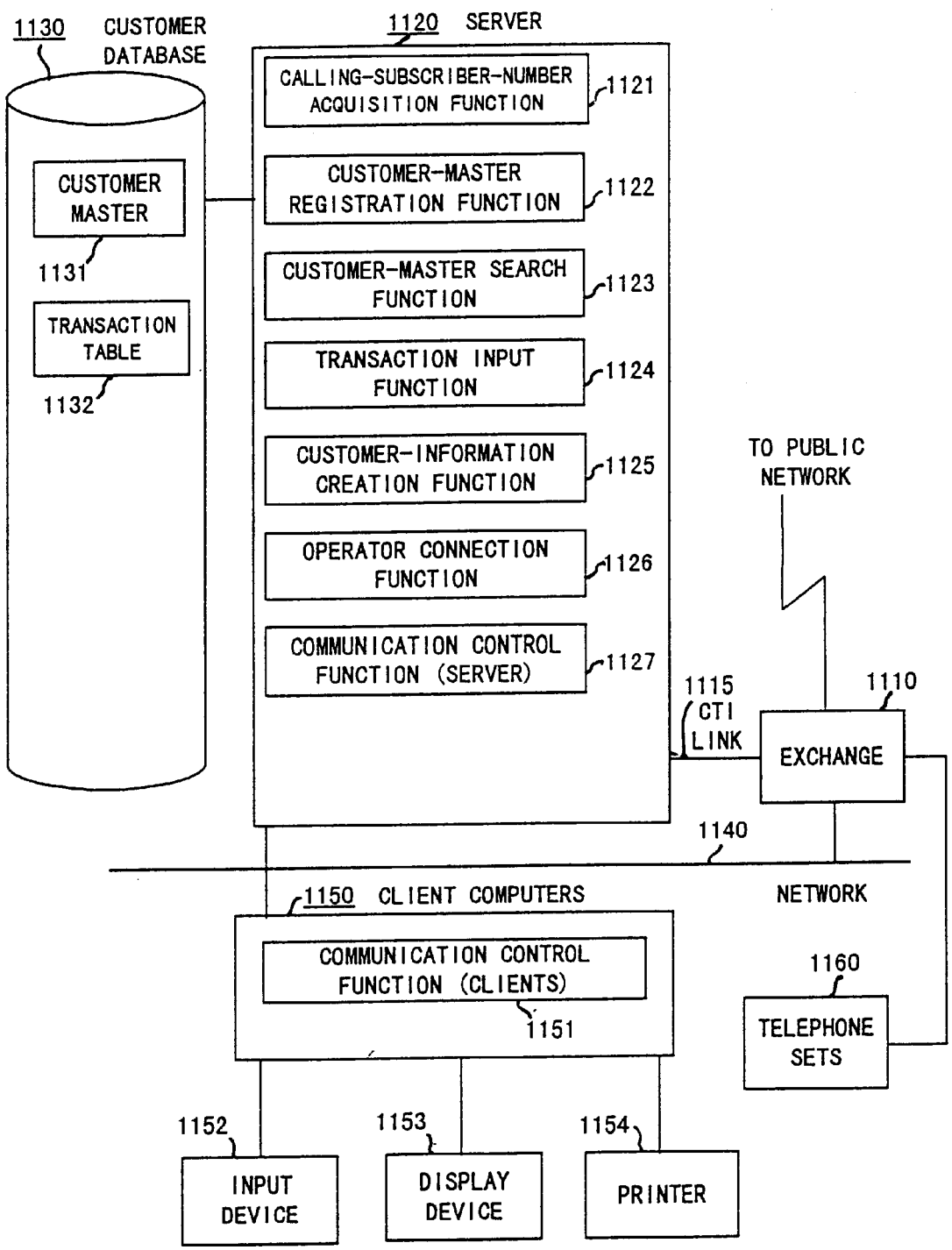
FIG. 2 is a block diagram showing in more detail the structures and functions of a server, client computers and a customer database which are included in the prior-art operator connection system.
Figure 3:
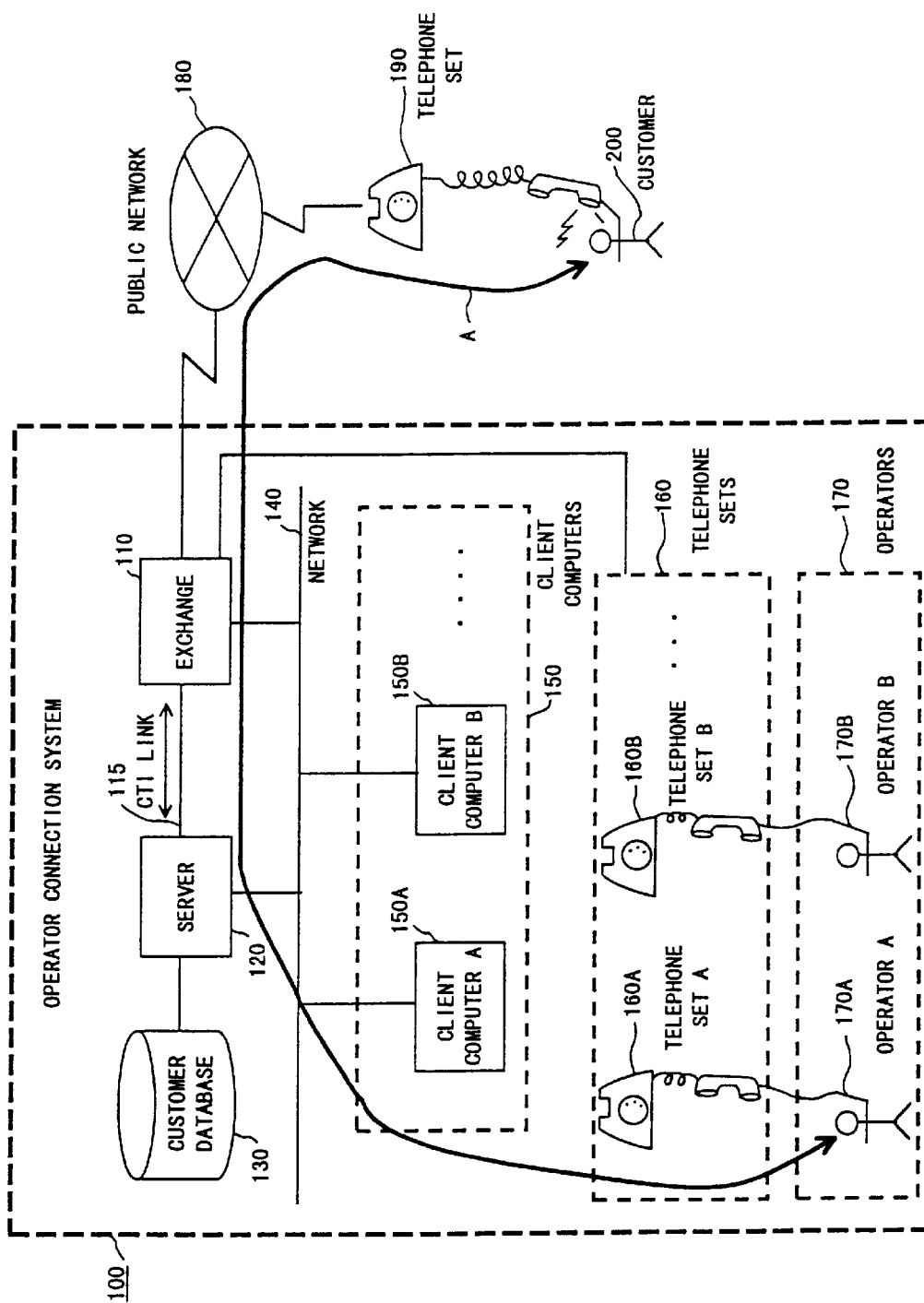
FIG. 3 is a schematic diagram showing an example of the architecture of an operator connection system in one aspect of performance of the present invention.

FIG. 3 is a diagram showing the architecture of an operator connection system 100 in one aspect of performance of the present invention. As indicated by a double-headed arrow "A", a customer 200 can often talk with an identical (familiar) one (for example, an operator-A 170A) of operators 170 owing to the introduction of the operator connection system 100 in this aspect of performance. Accordingly, smoother communications can be established for both the customer side and the operator side.

The operator connection system 100 illustrated in FIG. 3 comprises an exchange 110 being a PBX by way of example, a server (server computer) 120, a customer database 130, a network 140, a plurality of client computers 150 (150A, 150B, . . . ), and a plurality of telephone sets 160 (160A, 160B, . . . ) corresponding respectively to the plurality of client computers 150 (150A, 150B, . . . ).

The exchange 110 is connected to a public network 180, the server 120 and the telephone sets 160 (160A, 160B, . . . ). The server 120 is connected to the exchange 110 and the customer database 130. The exchange 110, the server 120 and the plurality of client computers 150 (150A, 150B, . . .) are interconnected through the network 140.

The customer 200 gives a telephone call to a predetermined telephone number by the use of his/her telephone set 190, whereby the telephone set 190 is connected to the exchange 110 through the public network 180. The call given by the customer 200 is first received by the exchange 110, in which the calling subscriber number of the customer 200 is acquired by utilizing, for example, the Calling Line Identification Presentation Service mentioned before. The calling subscriber number is the telephone number (subscriber's number) of the telephone set 190 possessed by the customer 200 in the public network 180 for which the customer 200 has subscribed.

The calling subscriber number or the like acquired by the exchange 110 is obtained from this exchange 110 through a CTI link 115 by the server 120.

Subsequently, on condition that the calling subscriber number obtained by the server 120 exists in the customer database 130 (in other words, that the customer 200 has ever called to the specific service), customer information items (for example, the address and name of the customer 200, including the calling subscriber number or the like) which correspond to the calling subscriber number are displayed on the display device of one of the client computers 150 (150A, 150B, . . . ) allocated to that one of the operators 170 (170A, 170B, . . . ) to whom the call of the customer 200 is to be connected, together with a transaction input form or the like.

If the customer 200 has ever called to the specific service, the customer database 130 is searched for the operators 170 (170A, 170B, . . . ) who have ever served the customer 200 of the calling subscriber number obtained by the server 120, and one of the operators 170 (170A, 170B, . . . ) is determined in accordance with a predetermined criterion. Subsequently, the telephone set 190 of the customer 200 and the telephone set 160 of the particular operator 170 (170A, 170B, . . . ) determined to serve the particular customer 200 are brought into line connection by the exchange 110 in compliance with a command delivered from the server 120, and the customer information items are displayed on the display device of the client computer 150 (150A, 150B, . . . ) allocated to the particular operator 170 (170A, 170B, . . . ). As a result, the particular operator 170 (for example, the operator-A 170A) having ever served the particular customer 200 can talk with this customer 200 while watching the customer information about the particular customer 200 and the transaction input form or the like.

The customer information items, such as the calling subscriber number, the address and the name, sent to the client computer-A 150A which is allocated to the operator-A 170A are displayed in the state, for example, in which the address and name of the calling customer 200 have already been entered in the input fields of the transaction input form for the address and the name. In the absence of the correspondent calling subscriber number of the customer 200 within the customer database 130, it is signified that the particular customer 200 is a new one who utilizes the specific service offered by the system 100. Accordingly, the customer information about the customer 200, including at least the calling subscriber number, need to be registered in the customer database 130 anew by, for example, the manual inputs of the operator-A 170A or the automatic operation of the system 100. Herein, since none of the operators 170 (170A, 170B, . . . ) has ever served the particular customer 200, any of the operators 170 (170A, 170B, . . . ) is assigned to the particular customer 200 anew in accordance with various criteria. Further, the transaction input form is displayed in the state in which nothing is entered in the input fields for the address and the name.

The system architecture of the operator connection system 100 illustrated in FIG. 3, merely exemplifies a typical construction in which the present invention is carried out. It is accordingly possible to adopt, for example, a different distributed-processing aspect in which the individual functions to be respectively processed distributively by such constituents as the exchange 110, server 120 and client computers 150 (150A, 150B, . . . ) are partly or wholly performed in the different constituents. Besides, in order to divide the plurality of operators 170 (170A, 170B, . . . ) into several groups and to station the respective groups at a plurality of key points, an environment for executing the distributed processing can be formed of a WAN (Wide Area Network), in which a plurality of sets each consisting of the client computers 150, telephone sets 160 and operators 170 are respectively allotted to the several key points in correspondence with the groups.

Figure 4:
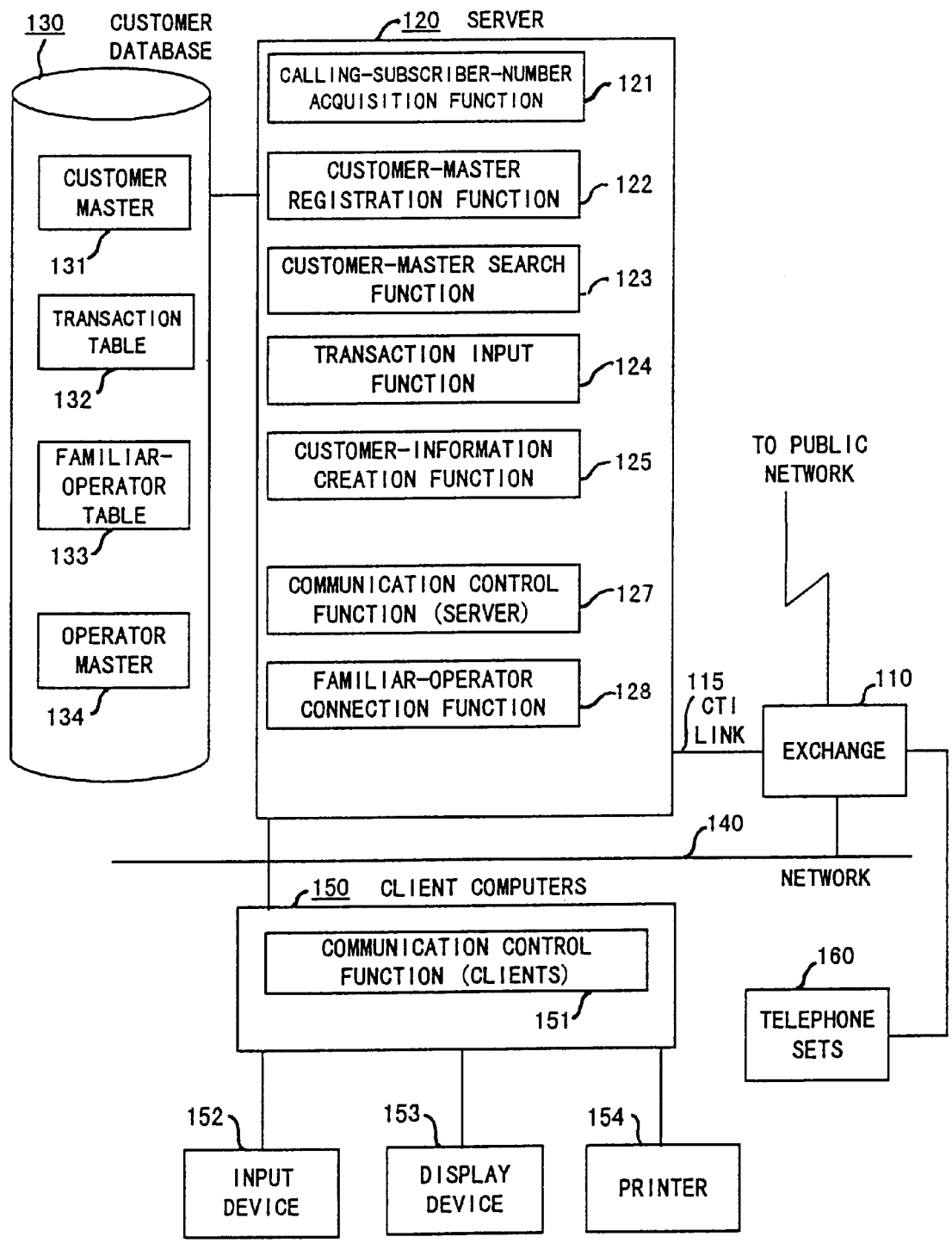
FIG. 4 is a block diagram showing in more detail the structures and functions of a server, client computers and a customer database which are included in the above operator connection system depicted in FIG. 3.

FIG. 4 exemplifies the more refined architecture of the operator connection system 100 illustrated in FIG. 3, and illustrates the server 120, client computers 150 and customer database 130 in more detail. Installed in the server 120 are a calling-subscriber-number acquisition function 121, customermaster registration function 122 (where the word "master" shall signify "master file", and the same shall apply hereinafter), customer-master search function 123, transaction input function 124, customer-information creation function 125, communication control function (server) 127 and "familiar"-operator connection function 128. Further, the customer database 130 includes a "familiar"-operator table 133 and an operator master 134 in addition to a customer master 131 and a transaction table 132. Besides, each of the client computers 150 has a communication control function (client) 151 installed therein, and it includes an input device 152, a display device 153 and a printer 154.

First, in the client computer 150, the communication control function (client) 151 causes the display device 153 to present display information sent from the communication control function (server) 127 of the server 120. Further, the communication control function (client) 151 sends the instructions, data inputs etc. of the corresponding one of the operators 170 (170A, 170B, . . . ) as entered through the input device 152, to the communication control function (server) 127 of the server 120.

The input device 152 is typically a keyboard or a mouse, while the display device 153 may well be a CRT display or the like display device. Besides, the printer 154 may well be a conventional ink-Jet printer or laser printer, and it can print desired data in compliance with the instructions of the operator 170. Each of the telephone sets 160 may well be a typical one or a headphone type one.

As stated before, the telephone set 160 is brought into line connection with the telephone set 190 of the customer 200 in FIG. 3 by the exchange 110 under the control of the server 120, finally it can communicate with the telephone set 190 of the customer 200. Herein, it is also possible to contrive each of the telephone sets 160 so as to be connected to the network 140 through a predetermined adaptor or the like without the intervention of the client computer 150, or to the exchange 110 through the corresponding client computer 150 as well as the server 120.

Such a flexible architecture has come to be realized owing to the facts that the performances of CPUs have been remarkably enhanced in recent years, and that the data transmission capacities of networks (LANs) have become large enough to transfer voices and motion pictures reasonably. More specifically, it has become possible that the server 120 fulfills PBX functions solely by a line switching board built therein, that the server 120 or the client computer 150 be furnished with some of the functions of the exchange 110, and that telephonic talking voice data be transmitted within the network 140.

The calling-subscriber-number acquisition function 121 of the server 120 acquires the calling subscriber number of the customer 200 from the exchange 110 through the CTI link 115 in a case where the exchange 110 has received the call from the customer 200.

The customer-master registration function 122 has the function of registering customer information about the customer 200 who is a new user for the specific service. For example, this function proceeds in such a way that a customer-master registration form (not shown) is displayed on the display device 153 of the client computer 150, and that the corresponding one of the operators 170 (170A, 170B, . . . ) manually enters the customer information items (for example, the calling subscriber number, address and name of the customer 200) into the displayed form, whereby the information items are registered into the customer master 131 which is included in the customer database 130 connected to the server 120. Alternatively, when the call from the customer 200 has been received, only the calling subscriber number is automatically registered into the customer master 131 by the system 100, and thereafter, the remaining customer information items (for example, the address and name of the customer 200) are into the customer-master registration image by the corresponding operator 170 (170A, 170B, . . . ).

The decision of the customer 200 as the new one is rendered in a case where the calling subscriber number acquired by the calling-subscriber-number acquisition function 121 has not been found within the customer master 131 in the customer-master search function 123 to be explained below (that is, in a case where the new customer 200 utilizes the specific service for the first time).

The customer-master search function 123 searches the customer master 131 for the calling subscriber number acquired by the calling-subscriber-number acquisition function 121. The table format of the customer master 131 is shown in FIG. 5A. The customer-master search function 123 seeks that row of a field "calling subscriber number (telephone number)" shown in FIG. 5A at which the acquired calling subscriber number is existent. In a case where the acquired calling subscriber number is existent, the function 123 can obtain information items set the other fields of the pertinent row (record), that is, customer information items about the particular customer, such as the customer number, family name (in "kana" which is the Japanese syllabary) and personal name (in "kana") of the particular customer. These customer information items are edited solely or in the form in which they have already been entered in the input fields of another form such as the transaction input form, and the edited display data are indicated on the display device 153 of the client computer 150, by the customer-information display function 125 to be explained below.

The familiar-operator connection function 128 searches the familiar-operator table 133 for the operator 170 who corresponds to the calling subscriber number acquired by the calling-subscriber-number acquisition function 121. In a case where the corresponding operator is existent, the familiar-operator connection function 128 commands the exchange 110 through the CTI link 115 to connect the call from the customer 200 to the telephone set 160 of the operator 170 found out by the search. On the other hand, in a case where the operator 170 corresponding to the calling subscriber number acquired by the calling-subscriber-number acquisition function 121 is not existent in the familiar-operator table 133, the call from the customer 200 is connected to the telephone set 160 of that operator 170 found out through the CTI link 115 who is not busy at present and who has never served the particular customer 200.

The format of the familiar-operator table 133 is shown in FIG. 5C. First, the familiar-operator connection function 128 seeks that row of a field "calling subscriber number" shown in FIG. 5C at which the acquired calling subscriber number is existent. In a case where the acquired calling subscriber number is existent, the function 128 obtains the "first-operator number", "second-operator number", "third-operator number" and "fourth-operator number" of the pertinent row. These operator numbers are the numbers of the operators 170 who have ever served the particular customer 200 of the correspondent calling subscriber number (in the field of the calling subscriber number). By way of example, the first-operator number can be set at the number of the operator 170 who has been designated by the particular customer 200, the second-operator number at the number of the operator 170 who served the particular customer 200 for the maximum cumulative time period among all the operators 170 (that is, who talked with the particular customer 200 longest), the third-operator number at the number of the operator 170 who took charge of transactions with the particular customer 200 oftenest among all the operators 170 (that is, who is the largest in the number of times of the transactions), and the fourth-operator number at the number of the operator 170 who took charge of the last transactions with the particular customer 200. Usually, the operator numbers are reset at a predetermined timing with reference to the transaction table 132 to be explained later.

Subsequently, the familiar-operator connection function 128 assigns the operators 170 to serve the received call of the particular customer 200, preferentially in the sequence of from the first-operator number to the fourth-operator number.

By way of example, in a case where the call of a calling subscriber number (telephone number) "03-3778-0001" which is contained in the familiar-operator table 133 shown in FIG. 5C has been received, the operator of the first-operator number ("001") is determined so as to serve the received call of the particular customer 200, on condition that he/she is not currently busy. Besides, in a case where the call of a telephone number "03-3778-0002" which is contained in the familiar-operator table 133 shown in FIG. 5C has been received, the operator 170 of the first-operator number ("002") is preferentially determined so as to serve the received call of the particular customer 200, on condition that neither of the operator 170 of the first-operator number ("002") and the operator 170 of the second-operator number ("001") is currently busy. Here, when the operator 170 of the first-operator number ("002") is busy, the operator 170 of the second-operator number ("001") is determined so as to serve the call of the particular customer 200. On condition that both of the operator 170 of the first-operator number ("002") and the operator 170 of the second-operator number ("001") are busy, a new operator 170 is determined so as to serve the particular customer 200 in accordance with a predetermined criterion.

The first- ~fourth-operator numbers can also be set in accordance with criteria other than those exemplified before, and such operator numbers can also be set in a number of at least five. Furthermore, although the priority levels of the operators 170 are set in the sequence of the first- ~fourth-operator numbers here, they can also be set to differ in units of the customers 200 (in other words, every calling subscriber number).

Lastly, the familiar-operator connection function 128 searches the operator master 134 shown in FIG. 5D, by the use of the determined operator number, so as to obtain the extension number of the operator 170 of the determined operator number, and it sends the specified extension number and a talk request to the exchange 110 through the CTI link 115. Thus, the exchange 110 bring the telephone set (190 in FIG. 3) of the customer 200 and the telephone set 160 of the operator 170 into line connection. The table format of the operator master 134 is shown in FIG. 5D. Each row (record) of the exemplified operator master 134 is composed of fields "operator number", "name of operator", "terminal number" and "extension number", and this operator master 134 manages the names, terminal numbers and extension numbers of the operators 170 for the respective operator numbers. The terminal number is the number of the client computer 150 allocated to the corresponding operator 170, while the extension number is that of the telephone set 160 allocated to the corresponding operator 170. Such information items about every operator 170 are altered each time the client computer 150 and telephone set 160 allocated to the corresponding operator 170 are changed.

When transaction data are entered into the transaction input form presented on the display device 153 of the client computer 150, through the input device 152 of this client computer 150 by the operator 170 (170A, 170B, . . . ), the transaction input function 124 obtains the transaction data through the communication control function (client) 151 of the client computer 150, the network 140, and the communication control function (server) 127 of the server 120, and it executes the check etc. of the transaction data here in the server 120. Thereafter, the transaction input function 124 supplements the transaction table 132 of the customer database 130 with the contents of the transaction data (that is, information items indicating how the customer 200 having called has transacted).

An example of the format of the transaction table 132 is shown in FIG. 5B. This table 132 in which each row (record) is composed of fields "calling subscriber number", "operator number", "date of transactions" and "time period of transactions (in minutes), is supplemented with a record every occasions of transactions. That is, the record contains the calling subscriber number of the customer 200, the operator number of the operator 170 having served the particular customer 200, the date of the transactions, and a time period expended on the transactions.

Although not illustrated here, the operator connection system 100 can also be contrived so that processes peculiar to the specific service, such as the creations of account data and commodity ordering data, may be automatically executed upon entering the transaction data.

In this embodiment, the customer 200 gives the telephone call with the intention of transacting (for example, purchasing a commodity), while the operator 170 accepts the order and enters the contents of the transactions into the system 100. However, the operator connection system of the present invention is also applicable to a service in which no transactions are involved, such as customer support service. In this case, a customer 200 gives a telephone call with the intention of inquiring about a product by way of example, while an operator 170 replies to the inquiry. The contents of such dealings are stored in a database. Accordingly, a dealing table or the like is prepared instead of the transaction table 132 shown in FIG. 5B. A calling subscriber number and an operator number are stored in the dealing table as in the transaction table 132, and the contents and date of the dealing, etc. are further stored. As will be explained below, also data which are created by the customer-information creation function 125 and which are displayed on the display device 153 of the client computer 150 include the contents of the dealings of the operator 170.

On condition that the customer information items corresponding to the acquired calling subscriber number have been decided to be existent in the customer master 131 by the customer-master search function 123, the customer-information creation function 125 edits the display data of a form containing the customer information items solely, the transaction input form in which they have already been entered in the input fields, or the like. In contrast, on condition that the customer information items corresponding to the acquired calling subscriber number have been decided to be nonexistent in the customer master 131 by the customer-master search function 123, the customer-information creation function 125 edits the display data of the transaction input form or the like in which nothing is entered in the input fields of this form.

The edited display data are sent through the communication control function (server) 127, the network 140 and the communication control function (client) 151 to, and are indicated on, the display device 153 of the client computer 150 allocated to the operator 170 (for example, the operator-A 170A) determined so as to serve the current call of the customer 200 by the familiar-operator connection function 128. The terminal number for identifying the client computer 150 by which the edited display data are presented, is obtained from the operator master 134 in FIG. 5D by the familiar-operator connection function 128 as stated before.

The communication control function (server) 127 of the server 120 sends the display data etc. toward the client computer 150 as stated before, to the communication control function (client) 151 of the client computer 150 through the network 140. Conversely, the function 127 of the server 120 receives data, instructions etc. entered using the input device 152 of the client computer 150, from the communication control function (client) 151 of the client computer 150 through the network 140.

Thus far, the operator connection system 100 in this aspect of performance has been described as to the respective classified functions for the sake of better understanding. Such classification, however, does not have a one-to-one correspondence with the units of programs or objects within the respective constituents. By way of example, accordingly, all the functions in the server 120 may well be implemented by a single program, and the two tables in the customer database 130 may well be actually implemented as a single table.

Besides, although the customer master 131, transaction table 132 and familiar-operator table 133 explained before are managed in calling subscriber number units here, they can alternatively be managed for each calling subscriber number and the names (in "kanji"s which are Chinese characters used in Japanese writing) of customers (that is, "Calling subscriber number+Names of customers in kanjis" are set as primary keys). The reason for such management is that respective family members who share a single telephone set utilize an identical service in some cases.

Figure 6:
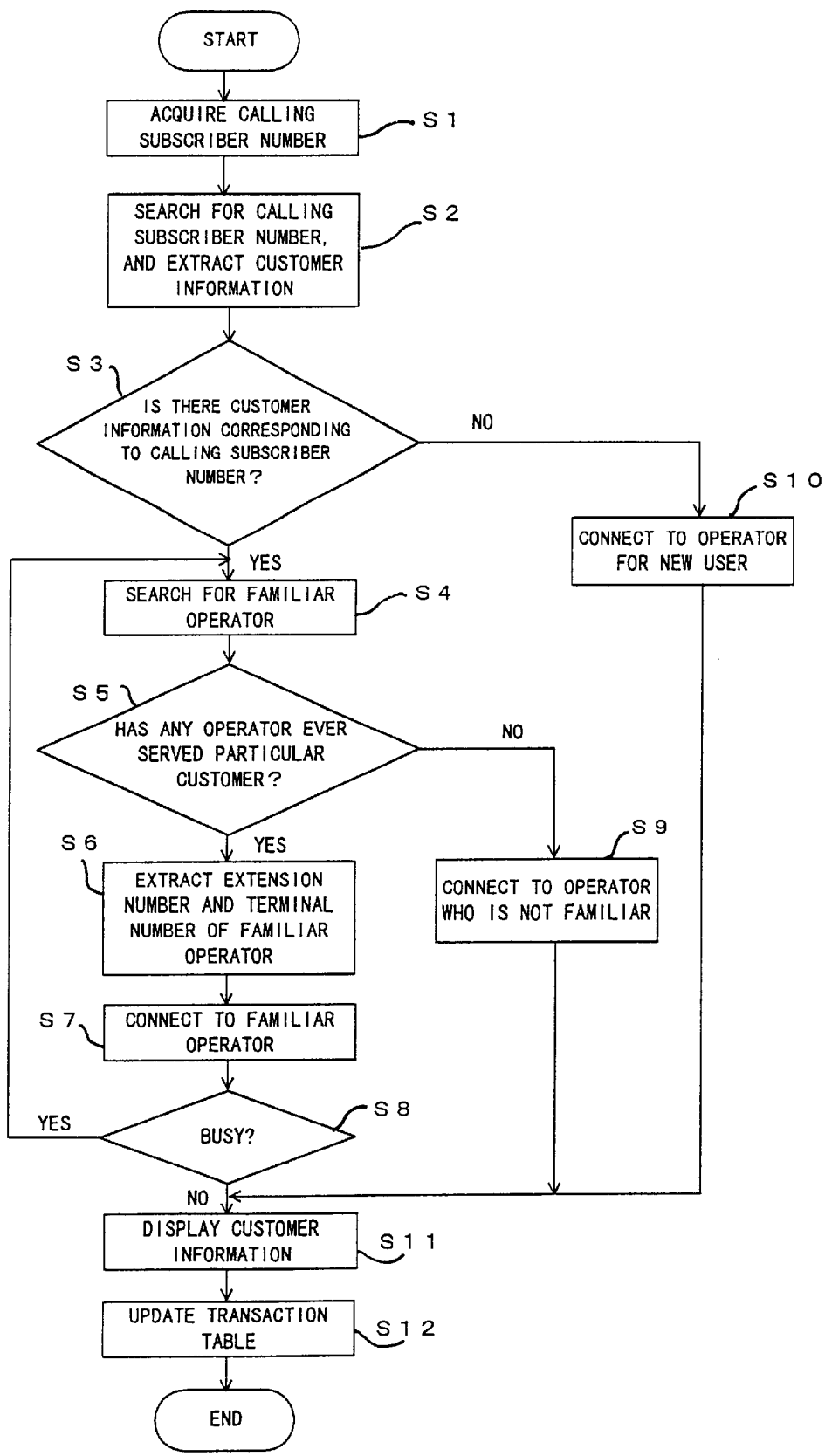
FIG. 6 is a flow chart showing an example of a processing flow which proceeds since the reception of a customer's call till the updating of the transaction table through the display of customer information, in the above operator connection system.

A flow chart in FIG. 6 schematically shows the flow of the processes of the operator connection system 100 in this aspect of performance, since the reception of a telephone call from a customer 200 till the connection of the call to a corresponding operator 170.

First, the acquisition of a calling subscriber number at step S1 is such that, when the exchange 110 has received the call from the customer 200, the server 120 acquires the calling subscriber number of the call from the exchange 110 through the CTI link 115. The acquisition process is executed by the calling-subscriber-number acquisition function 121 which is included in the server 120. Subsequently, customer information search/extraction at step S2 is such that the server 120 searches for the calling subscriber number within the customer master 131, and that it extracts customer information, such as an address and a name, correspondent to the calling subscriber number if the pertinent calling subscriber number is existent in the customer master 131. The search and extraction process is executed by the customer-master search function 123 which is included in the server 120.

At next step S3, the search result of step S2 is decided. In the absence of the calling subscriber number within the customer master 131 (step S3, "No"), it is signified that the customer 200 of the pertinent calling subscriber number utilizes the specific service for the first time. Therefore, owing to the operator connection process for a new customer as indicated at step S10, the extension number of the telephone set 160 (160A, 160B, . . . ) which is not currently busy is obtained from the exchange 110 through the CTI link 115, and the received call from the customer 200 is connected to the telephone set 160 (160A, 160B, . . . ) of the operator 170 (170A, 170B, . . . ) in charge of the telephone set 160 (160A, 160B, . . . ) of the pertinent extension number. Further, the server 120 searches the operator master 134 to obtain a terminal number corresponding to the operator 170 in charge. Then, step S10 is followed by step S11 at which the customer information is displayed. Besides, as will be explained later, the customer information of the particular customer 200 is entered anew at step S12. Since the connection of the received call to the operator 170 at step S10 concerns the new customer 200, it is also recommendable that an operator (170) directed toward new customers (200) is set, whereupon the received call from the customer 200 is connected to such an operator (170).

In the presence of the calling subscriber number within the customer master 131 at step S3 (step S3, "Yes"), it is signified that the customer 200 of the pertinent calling subscriber number has ever utilized the specific service. Therefore, owing to search for a familiar operator at step S4, the server 120 searches the familiar-operator table 133 for the operator number of the familiar operator 170 who has ever served the customer 200 of the pertinent calling subscriber number. In this regard, a plurality of familiar operators 170 might have ever served the single customer 200. As stated before, however, candidates for the familiar operators 170 to serve the customer 200 have already been set in the familiar-operator table 133 in accordance with the several criteria, so that one familiar operator 170 can be selected from among the candidates on the basis of predetermined priority levels.

FIGS. 9A, 9B and 9C illustrate "in data" and "out data" which are used in the operator connection system of the present invention. The in data #1 shown in FIG. 9A are data which are received by the server 120 in the calling-subscriber-number acquisition of step S1, and which contain the calling subscriber number. The out data shown in FIG. 9B are data which are used in the familiar-operator connection of step S7 to be explained later, and which contain an extension number extracted by the extension number/terminal number extraction of step S6. The in data #2 shown in FIG. 9C are data which result from the actual connection between the telephone set 160 allocated to the operator 170 and the telephone set 190 of the customer 200 at step S7 or S9, and which contain the extension number of the connected telephone set 160 of the operator 170.

In a case where the familiar operator 170 having ever served the customer 200 has not been found within the familiar-operator table 133 by the search of step S4 (step S5, "No"), the extension number of the telephone set 160 which is not currently busy is obtained from the exchange 110 through the CTI link 115 by the other-operator connection of step S9, and the call from the customer 200 is connected to the operator 170 who has never served the particular customer 200 and who is in charge of the telephone set 160 of the pertinent extension number. Besides, the server 120 searches the operator master 134 to obtain the terminal number of the operator 170. Then, step S9 is followed by step S11. This processing arises in such a situation where the operator 170 having ever served the particular customer 200 is absent on the day on which the call has been received from the particular customer 200, or where he/she has already retired from the service. It arises also in case of the decision at step S8 to be explained below, that all of the familiar operators 170 having ever served the calls of the particular customer 200 are busy at present. By the way, in the case where the decision "No" has been rendered at step S5, a voice response equipment (not shown) connected to the exchange 110 may well be used to give the customer 200 the message that the operator having ever served the call of the particular customer 200 is busy at present, and that the customer 200 is asked to select whether the particular operator 170 is to ring the customer 200 back or the current call of the customer 200 is to be connected to another operator 170. Herein, when the connection to another operator 170 is replied, the process of step S9 may well be executed. In contrast, when the customer 200 desires the connection to the operator 170 having ever served him/her, the measure may well be taken that, after the talk of the particular operator 170 has ended, the telephone set 160 of the particular operator 170 is called up to give the particular operator 170 the instruction of ringing up the particular customer 200.

In a case where the operator 170 having ever served the customer 200 has been found within the familiar-operator table 133 by the search of step S4 (step S5, "Yes"), the terminal number and extension number corresponding to the operator number of the operator 170 who has been determined to serve the customer 200 are extracted from the operator master 134 in the extension number/terminal number extraction of step S6. Subsequently, in the search of step S7, the server 120 gives the command of connecting the call from the customer 200, through the CTI link 115 to the telephone set 160 of the extension number of the operator 170 who has been determined to serve the particular customer 200.

In a case where the line of the telephone set 160 of the extracted extension number is busy in connecting the call of the customer 200 to this telephone set 160, in other words, where the server 120 has been received call control information to the effect that the telephone set 160 is busy, from the exchange 110 through the CTI link 115 (step S8, "Yes"), the control flow returns to step S4, at which the operator 170 of the next highest priority level is searched for among the operators 170 having ever served the call of the particular customer 200. The above expression that "the line is busy" shall signify, not only the busy state in the strict sense of the words, but also other states where the normal connection is impossible, such as a state where the determined operator 170 happens to leave his/her seat and cannot take the call. Besides, the expression shall contain, not only a case where the telephone set 160 of the operator 170 is busy when the exchange 110 tries to establish the line connection, but also a case where it continues to lie in the busy state though the exchange 110 has tried the line connection several times for a predetermined time period. In such a case, the voice response equipment (not shown) connected to the exchange 110 may well be used to transmit such a voice signal as "PLEASE WAIT A MOMENT" to the telephone set 190 of the customer 200 until the line connection succeeds. It is also possible to take the measure that, when the server 120 has received call control information indicative of the line disconnection (call termination) of the telephone set 160 of the operator 170 from the exchange 110 through the CTI link 115, the familiar-operator connection function 128 manages the telephone sets 160 of all the operators 170 as to whether or not they are busy.

Steps S4 through S10 stated above are executed by the exchange 110 and the familiar-operator connection function 128 included in the server 120.

In a case where the line of the telephone set 160 of the extracted extension number is not busy and is normally connected in connecting the call of the customer 200 to this telephone set 160, in other words, where the server 120 has been received call control information to the effect that the normal line connection has been established, from the exchange 110 through the CTI link 115 (step S8, "No"), the customer information display of step S11 proceeds in such a way that the display device 153 of the client computer 150 identified by the terminal number extracted from the operator master 134 is caused to display the customer information items of the customer 200, such as the address and name, solely or in the state in which they have already been entered in the corresponding input fields of the transaction input form. This process for displaying the customer information is similarly executed even when the customer's call has been finally connected to the operator 170 having never served the particular customer 200, by step S9. In contrast, when the customer's call has been connected to the operator 170 for the new users by step S10, all the customer information items are presented as blank spaces. Incidentally, this process is executed by the customer-information creation function 125 and communication control function (server) 127 included in the server 120, and the communication control function (client) 151 included in the client computer 150.

Thereafter, transaction inputs are entered into the transaction form presented on the display device 153 of the client computer 150, through the input device 152 thereof, and via the conversation of the operator 170 connected with the call from the customer 200. Then, in the transaction table updating of step S12, the contents of the transactions are added to the transaction table 132, whereupon the processing flow is ended. In this process for the transaction inputs, when the customer 200 is the new user, the customer information of this customer 200 is entered, and the record of the customer information is added to the customer master 131. This process for the transaction addition is executed by the transaction input function 125 included in the server 120.

At each of steps S7, S9 and S10, the process for connecting the call of the customer 200 to the telephone set 160 of the operator 170 is executed by the exchange 110 when the familiar-operator connection function 128 has sent the extension number of the telephone set 160 and a request for a talk, to this exchange 110 through the CTI link 115.

FIG. 7 is a diagram showing an example of the transaction input form which is displayed on the display device 153 of the client computer 150 allocated to the operator 170. As stated before, the transaction input form 400 is displayed in the state in which the customer information items of the customer 200, such as the address and name, have already been entered in a customer-information input area 410. Further, in this example, the history of transactions concerning the particular customer 200 as extracted from the transaction table 132 is presented in a purchase-history display area 420. The contents of the transactions indicated by the customer 200 are entered into a transaction input area 430 by the operator 170. Such a transaction input form 400 can be formed as a single window which operates on an operating system offering a multiwindow operation environment, such as "Windows 95" from Microsoft, or "Solaris" or "Sun OS" from SUN Microsystems. Accordingly, the operator 170 can display various other forms on the display device 153 of the client computer 150 simultaneously with the form 400.

FIG. 8 illustrates a selection form 500 for selecting any of a plurality of customers 200 who have an identical calling subscriber number, the form being displayed on the display device 153 of the client computer 150 allocated to the operator 170 who serves the customer 200. The form 500 is displayed, for example, in a case (1) where the record of the customer master 131 bears the customer information every "calling subscriber number+name of customer in kanjis", while the record of the familiar-operator table 133 bears the operator number every calling subscriber number only, or a case (2) where the record of the customer master 131 bears the customer information every "calling subscriber number+name of customer in kanjis", while the record of the familiar-operator table 133 bears the operator number every "calling subscriber number+name of customer in kanjis", and where, when the call of one of the customers 200 has been received in such a set situation, also the customer information of any other customer 200 having the identical calling subscriber number is designated to be displayed.

The pertinent calling subscriber number is presented in a search key area 510, and the customer information items about the customers 200 having the identical calling subscriber number presented in the search key area 510 are presented in a customer-information display area 520. In the example of FIG. 8, the customer information items about the two persons; "Jiroh SUZUKI" and "Keiko SUZUKI" who have the identical calling subscriber number "03-3778-8211" are respectively presented.

Figure 10:
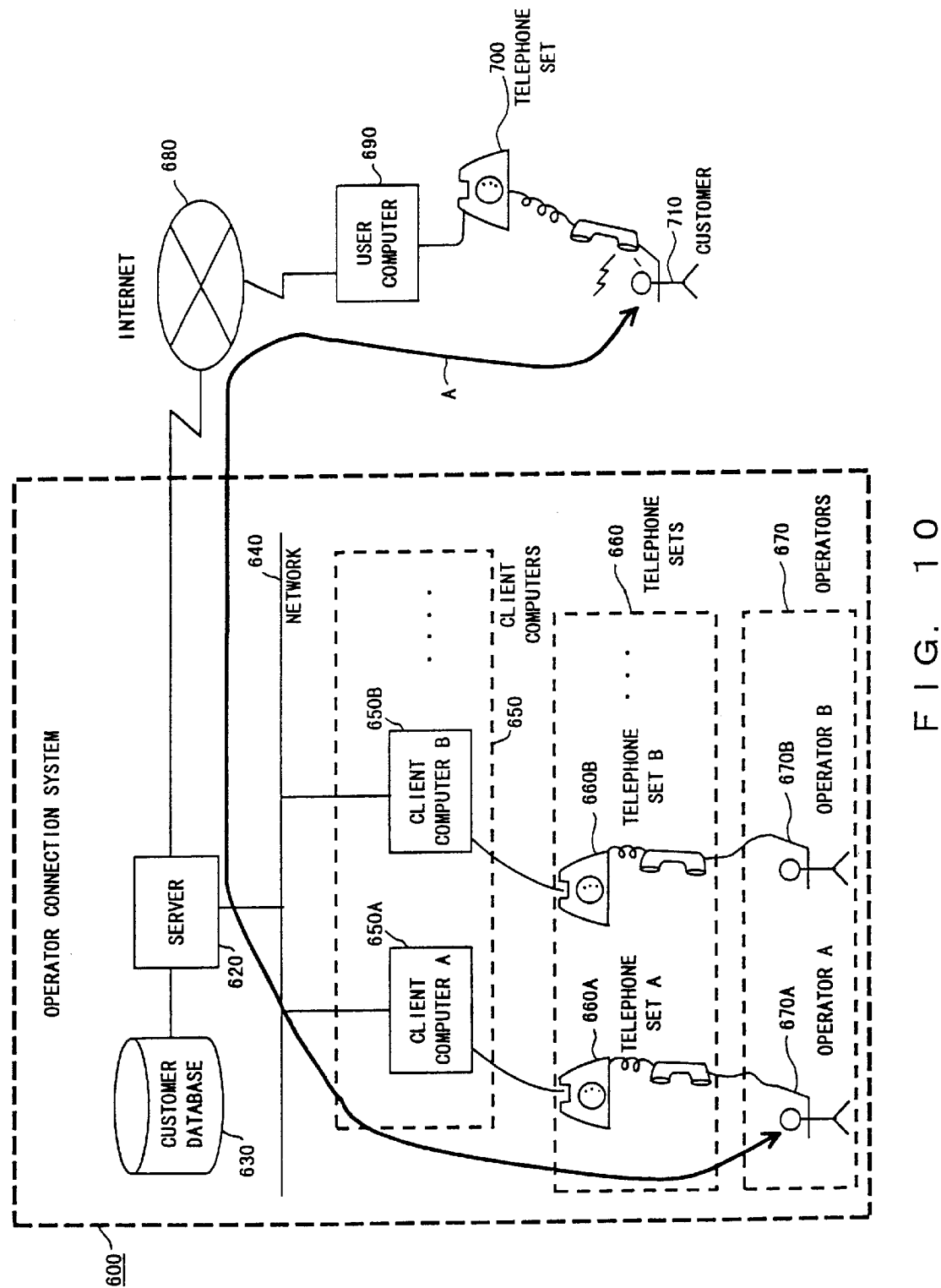
FIG. 10 is a schematic diagram showing an example of the architecture of an operator connection system in another aspect of performance of the present invention.

FIG. 10 is a diagram showing the architecture of an operator connection system 600 in another aspect of performance of the present invention. This aspect of performance consists in a case where a customer 710 calls to a predetermined service by utilizing the Internet 680 instead of a public network. The way of such calling has been known as the "Internet telephone" in recent years. Also here, as indicated by a double-headed arrow "A", the customer 710 can often talk with an identical (familiar) one (for example, an operator-A 670A) of operators 670 owing to the introduction of the operator connection system 600 in this aspect of performance. Accordingly, smoother communications can be established for both the customer side and the operator side.

The operator connection system 600 illustrated in FIG. 10 comprises a server (server computer) 620, a customer database 630, a network 640, a plurality of client computers 650 (650A, 650B, . . . ), and a plurality of telephone sets 660 (660A, 660B, . . . ).

The server 620 is connected to the customer database 630. The plurality of client computers 650 (650A, 650B, . . . ) are respectively connected to the corresponding ones of the telephone sets 660 (660A, 660B, . . . ). The server 620 and the plurality of client computers 650 (650A, 650B, . . . ) are interconnected through the network 640.

The customer 710 accesses the server 620 via the Internet 680 by the use of his/her user computer 690. Although not shown in detail, actually the access is effected as stated below. First, the customer 710 connects the user computer 690 through a public network or the like to the access point of a predetermined dealer termed "Internet Service Provider" which offers connections to the Internet. Subsequently, he/she logs into an Internet-phone server (being the server 620 in some cases) which is installed in the provider and which offers the service of the Internet telephone. Further, he/she transmits to the Internet-phone server his/her ID (correspondent to a calling subscriber number) which is registered in the service provider beforehand, and an ID of the server 620 being a called destination (correspondent to a telephone number to which the customer 710 calls). Thus, the Internet-phone server calls out the server 620, and the function of the Internet telephone becomes available between the telephone set 700 of the customer 710 and the server 620 of the operator connection system 600. On this occasion, also the server 620 must be held connected to the Internet 680 by any method (desirably by a dedicated line). The function of the Internet telephone performs substantially the same talks as those of ordinary telephones. Since, however, the telephone sets 660 (660A, 660B, . . . ) and the telephone set 700 are respectively connected to the client computers 650 (650A, 650B, . . . ) and the user computer 690, it is sometimes the case that the bidirectional or interactive talks are not possible, but that the unidirectional talk which permits the customer 710 or the operator 670 to talk only in one way at one point of time is possible, depending upon the sorts of voice processing cards or the likes mounted on the client computers 650 (650A, 650B, . . . ) and the user computer 690 or upon the CPU capabilities of these computers. Usually, in the case where the telephone sets 660 (660A, 660B, . . . ) and the telephone set 700 are respectively connected to the client computers 650 (650A, 650B, . . . ) and the user computer 690 in such a scheme, the functions of the telephone sets 660 (660A, 660B, . . . ) proper and the telephone set 700 proper are often kept in dedicated software and in an extended board such as a sound source/voice processing card, respectively. In external appearance, accordingly, only handsets (microphones as well as loudspeakers, or the likes) are often connected to the client computers 650 (650A, 650B, . . . ) and the user computer 690, respectively.

In this way, the call (of the Internet telephone) from the customer 710 is connected to the server 620, and the talks between the customer side and the system side become possible. On this occasion, the server 620 acquires the ID of the customer 710 or the identifier of the customer 710 corresponding to the ID (here, the ID or the identifier shall be termed the "calling subscriber number") from the Internet-phone server. The server 620 can receive the calling subscriber number in accordance with any known protocol and format at the connection between the Internet-phone server and the server 620 itself or at any other timing.

Subsequently, on condition that the calling subscriber number obtained by the server 620 exists in the customer database 630 (in other words, that the customer 710 has ever called to the specific service), customer information items (for example, the address and name of the customer 710, including the calling subscriber number or the like) which correspond to the calling subscriber number are displayed on the display device of one of the client computers 650 (650A, 650B, . . . ) allocated to that one of the operators 670 (670A, 670B, . . . ) to whom the call of the customer 710 is to be connected, together with a transaction input form or the like.

If the customer 710 has ever called to the specific service, the customer database 630 is searched for the operators 670 (670A, 670B, . . . ) who have ever served the customer 710 of the calling subscriber number obtained by the server 620, and one of the operators 670 (670A, 670B, . . . ) is determined in accordance with a predetermined criterion. Subsequently, the telephone set 700 of the customer 710 is connected to the telephone set 660 of the particular operator 670 (670A, 670B, . . . ) determined to serve the particular customer 710, under the control of the server 620, and the customer information items are displayed on the display device of the client computer 650 (650A, 650B, . . . ) allocated to the particular operator 670 (670A, 670B, . . . ). As a result, the particular operator 670 (for example, the operator-A 670A) having ever served the particular customer 710 can talk with this customer 710 while watching the customer information about the particular customer 710 and the transaction input form or the like.

The customer information items, such as the calling subscriber number, the address and the name, sent to the client computer-A 650A which is allocated to the operator-A 670A are displayed in the state, for example, in which the address and name of the calling customer 710 have already been entered in the input fields of the transaction input form for the address and the name. In the absence of the correspondent calling subscriber number of the customer 710 within the customer database 630, it is signified that the particular customer 710 is a new one who utilizes the specific service offered by the system 600. Accordingly, the customer information about the customer 710, including at least the calling subscriber number, need to be registered in the customer database 630 anew by, for example, the manual inputs of the operator-A 670A or the automatic operation of the system 600. Herein, since none of the operators 670 (670A, 670B, . . . ) has ever served the particular customer 710, any of the operators 670 (670A, 670B, . . . ) is assigned to the particular customer 710 anew in accordance with various criteria. Further, the transaction input form is displayed in the state in which nothing is entered in the input fields for the address and the name.

The system architecture of the operator connection system 600 illustrated in FIG. 10, merely exemplifies a typical construction in which the present invention is carried out through the Internet. Accordingly, even in a case, for example, where a connection scheme is altered as to the Internet telephone in future and where means for identifying the customer 710 becomes different from that of the illustrated embodiment, such an aspect of performance shall also be covered within the scope of the present invention as long as the server 620 can finally identify the customer 710.

It is also possible to adopt a different distributed-processing aspect in which the individual functions to be respectively processed distributively by such constituents as the server 620 and client computers 650 (650A, 650B, . . . ) of the operator connection system 600 are partly or wholly performed in the different constituents. Further, in order to divide the plurality of operators 670 (670A, 670B, . . . ) into several groups and to station the respective groups at a plurality of key points, an environment for executing the distributed processing can be formed of a WAN (Wide Area Network), in which a plurality of sets each consisting of the client computers 650, telephone sets 660 and operators 670 are respectively allotted to the several key points in correspondence with the groups.

The detailed structures and operations of the server 620, customer database 630 and client computers 650 of the operator connection system 600 illustrated in FIG. 10 are the same as those of the system illustrated in FIG. 4, except the facts that, as explained before, the server 620 acquires the calling subscriber number from the Internet-phone server via the Internet 680, and that the server 620 relays the talk between the telephone set 700 of the customer 710 and the telephone set 660 of the operator 670.

In addition, even in a case where, in the operator connection system 600 illustrated in FIG. 10, the server 620 is configured of a WWW server, a database server and a server adapted for the Internet telephone, while a WWW browser is installed in each of the client computers 650, thereby to construct an intranet, the operator connection system of the present invention can be incarnated. In this case, the communication control function (client) 151 to be installed in the client computer 650 as shown in FIG. 4 can be downloaded in the form of, for example, a JAVA Applet or ActiveX control from the server 620 functioning as the WWW server, and function expanding operations as well as various maintenance operations can be efficiently performed. Also, the customer 710 can give a call to the operator connection system 600 through the screen of a WWW browser installed in the user computer 690, and he/she can transmit his/her calling subscriber number to the server 620.

Besides, calling schemes which utilize the Internet include, not only (1) the computer-to-computer scheme as stated above, but also (2) a computer-to-telephone set scheme and (3) a telephone set-to-telephone set scheme which utilize telephone network gateways. It is accordingly possible to connect the operator connection system to the access point of an Internet-telephone connection service dealer through a public network as well as a leased line, whereby an Internet-telephone call which a customer makes with a conventional telephone set through the Internet-telephone connection service dealer can be received similarly to an ordinary telephone call through the public network. In this case, by way of example, the telephone network gateway mounted on the access point of the Internet connection service dealer acquires the calling subscriber number of the customer by utilizing a calling line identification presentation service, and it reports the acquired calling subscriber number to the server of the operator connection system through the access point and leased line which are connected to the operator connection system. In this case, the customer and the operator talk using the conventional telephone sets.

Further, when the operator connection system 100 illustrated in FIG. 3 and the operator connection system 600 illustrated in FIG. 10 are integrated, it is possible to build an operator connection system in which the customers (200, 710) can be similarly served via either of the public network 180 and the Internet 680. In this case, a database is built in which calling subscriber numbers acquired from calls made via the public network 180 and calling subscriber numbers (IDs) acquired from calls (Internet phones) made via the Internet 680 are managed in unified fashion in customer units. Thus, whether any of the customers (200, 710) gives calls via the public network 180 or via the Internet 680, the operator connection system can connect the specified customer to a familiar operator based on unified consideration of the actual results of the calls.

Figures 11A, 11B:
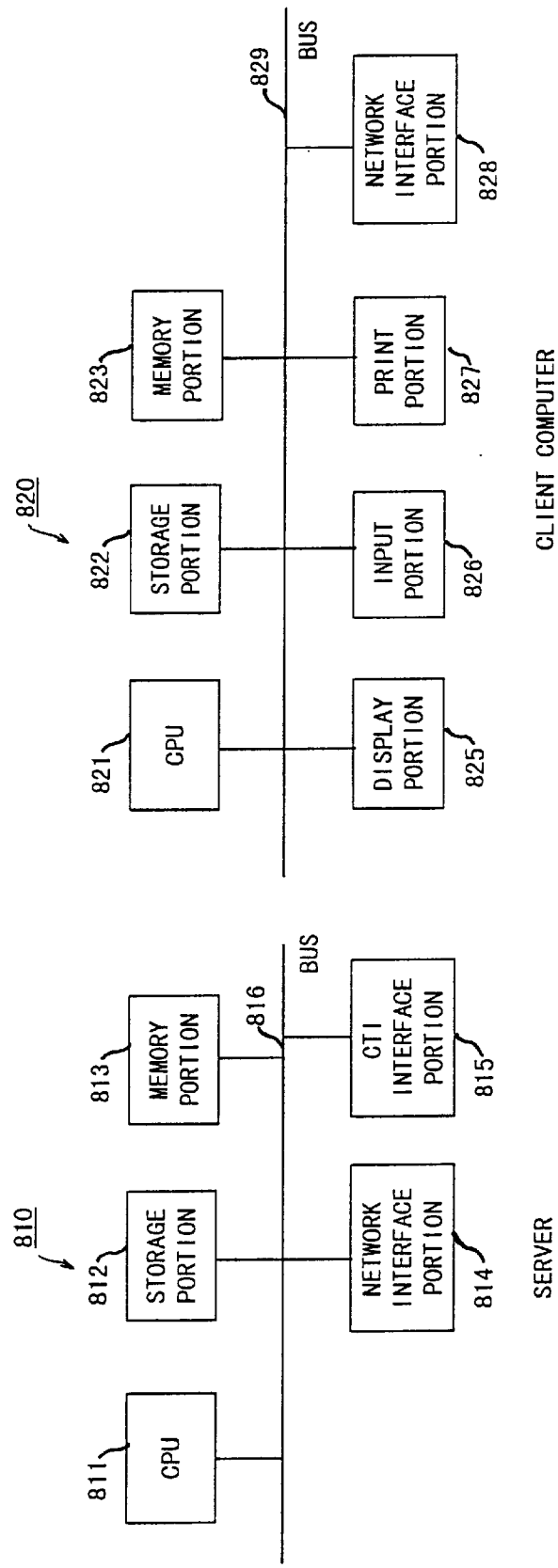
FIGS. 11A and 11B are diagrams showing the constituent block arrangements of a server and a client computer by which the present invention is performed, respectively.

Meanwhile, programs for carrying out the operator connection method in this aspect of performance can be run on computers which have hardware architectures exemplified in FIGS. 11A and 11B, respectively. FIG. 11A illustrates the hardware architecture which concerns the computer 810 of the server 120 for performing the method. The computer 810 includes a CPU 811, a storage portion 812, a memory portion 813, a network interface portion 814 and a CTI interface portion 815 which are respectively connected to a bus 816. In relation to the incarnation of this aspect of performance, the CPU 811 executes processes necessary for this aspect of performance, such as the search of the customer database 130 and the control of communications with the client computer 150. The storage portion 812 stores therein the data of the respective tables which are included in the customer database 130, and programs which are necessary for incarnating this aspect of performance and which are run by the CPU 811. In incarnating this aspect of performance, the data and the programs are loaded into the memory portion 813 as may be needed. The network interface portion 814 is an interface for sending to the client computer 150 data etc. which are to be displayed on the display device of this computer 150, and for receiving from the client computer 150 data etc. which are entered through the input device of this computer 150. The CTI interface portion 815 is an interface with respect to the exchange 110, for acquiring information on the reception of a call from a customer, information on the talking situation of an operator 170, etc., from the exchange 110 through the CTI link 115. The bus 816 is a common transmission channel for sending and receiving data, commands, etc. among the constituents 811–815.

FIG. 11B illustrates the hardware architecture which concerns the computer 820 of the client computer 150 for performing the operator connection method in this aspect of performance. The computer 820 includes a CPU 821, a storage portion 822, a memory portion 823, a display portion 825, an input portion 826, a print portion 827 and a network interface portion 828 which are respectively connected to a bus 829. In relation to the incarnation of this aspect of performance, the CPU 821 executes processes necessary for this aspect of performance, such as the presentation of display data sent from the server 120 and the sending of data entered through the input portion 826, to the server 120. The storage portion 822 stores therein programs which are necessary for incarnating this aspect of performance and which are run by the CPU 821. In incarnating this aspect of performance, the data and the programs are loaded into the memory portion 823 as may be needed. The display portion 825 is the display device 153 such as a CRT monitor which presents a transaction form to an operator 170. The input portion 826 is the input device 152 including a keyboard, a mouse etc. through which the operator 170 enters transaction data etc. into the transaction form. The print portion 827 is the printer 154 such as laser printer, by which data stored in the storage portion 822, etc. are printed in compliance with the instructions of the operator 170. The network interface portion 828 is an interface for sending input data etc. to the server 120, and for receiving from the server 120 display data concerning customer information, data for displaying a transaction input form, etc. The bus 829 is a common transmission channel for sending and receiving data, commands, etc. among the constituents 821~828.

As stated before, regarding the server 120, the client computers 150 and the exchange 110, the relationships between these constituents and functions to be implemented are not strictly restricted nowadays owing to the enhanced performances of CPUs and the heightened transmission rates of networks. In relation to the incarnation of the method of the present invention, accordingly, the arrangements of the individual constituents in the server 120 and the client computer 150 as respectively shown in FIGS. 11A and 11B ought not to be construed strictly.

As described above, according to the present invention, an operator connection system is incarnated which performs such a control that a telephone call from a customer who called in the past is connected to an operator who served the call in the past, as far as possible. As a result, the familiar operator who often served the calls of the particular customer is preferentially connected, so that the communications between the customer and the operator can smoothly proceed, and that the dealings of the operators can be made efficient. Furthermore, it can be expected that the customers will be more satisfied with a service and will wish to utilize the service more positively.

What is claimed is:

1. An operator connection system wherein, telephone calls are received from unspecified customers, and they are respectively connected automatically to telephone sets allocated to operators, comprising:

a calling-subscriber-information acquisition unit acquiring calling subscriber information of the received call of the customer;

a customer-information storage unit storing therein customer information about said customer, which includes at least the calling subscriber information;

a customer-information registration unit registering the customer information into said customer-information storage unit;

a decision unit deciding if said calling subscriber information acquired by said calling-subscriber-information acquisition unit, exists among such customer information stored in said customer-information storage unit, when the customer's call has been received;

a familiar-operator-information storage unit storing familiar operator information corresponding to said calling subscriber information, the familiar operator information being based on an operator serving history, which includes identification information of at least one of an operator who is designated by the customer, an operator who served the customer for maximum cumulative time period among all the operators, an operator who took charge of transactions with the customer most often among all the operators and an operator who took charge of last transactions with the customer; and a first call connection unit searching said familiar operator information for identification information of operators corresponding to said calling subscriber information of the received customer's call, and connecting said customer's call to the telephone set allocated to said operators searched, in a case where the decision unit decides that said customer information exists in said customer-information storage unit, wherein when the identification information of at least two operators have been searched, one of said at least two operators is selected, and the identification information of the selected operator is used for the call connection.

2. An operator connection system as defined in claim 1, further comprising:

a second call connection unit connecting said received customer's call to the telephone set allocated to one of the operators selected in accordance with any desired criterion, in a case where said customer information including said call subscriber information of said received customer's call has been decided to be non-existent in said customer-information storage unit by said decision unit.

3. An operator connection system as defined in claim 1, further comprising:

a first-operator-environment-information storage unit storing therein first operator environment information for each of the operators, the first operator environment information including at least information for identifying the telephone set allocated to the corresponding operator and information for identifying said corresponding operator;

wherein said first call connection unit connects said received customer's call connection means connects said received customer's call to said telephone set allocated to said corresponding operator, with reference to such first operator environment information stored in said first-operator-environment-information storage unit.

4. An operator connection system as defined in claim 1, further comprising:

a display control unit performing a control so as to display said customer information on a terminal allocated to said operator, in accordance with the connection of said customer's call to said telephone set allocated to said operator.

5. An operator connection system as defined in claim 4, further comprising:

a second-operator-environment-information storage unit storing therein second operator environment information for each of the operators, the second operator environment information including at least information for identifying the terminal allocated to the corresponding operator and information for identifying said corresponding operator, wherein said display control unit includes a sending unit sending said customer information to said terminal allocated to said operator, with reference to such second operator environment information stored in said second-operator-environment-information storage unit.

6. An operator connection system as defined in claim 1, wherein said customer-information storage unit stores information items about a plurality of customers in correspondence with said one calling subscriber information.

7. An operator connection system as defined in claim 1, further comprising:

a designation unit optionally designating a criterion in accordance with which said first call connection unit selects one of said identification information of said at least two operators.

8. An operator connection system as defined in claim 7, further comprising:

a setting unit optionally setting the criterion for the selection, every said calling subscriber information.

9. An operator connection system as defined in claim 1, wherein said calling subscriber information is a telephone number of said received customer's call.

10. An operator connection method, wherein telephone calls are received from unspecified customers, and they are respectively connected automatically to telephone sets allocated to operators who offer service, comprising:

searching for at least one of an operator who is designated by the customer, an operator who served the customer for maximum cumulative time period among all the operators, an operator who took charge of transactions with the customer most often among all the operators and an operator who took charge of last transactions with the customer, on the basis of the received call of the particular customer; and connecting the customer's call to one of the searched operators.

11. A storage medium storing therein a program for implementing an operator connection method, wherein telephone calls are received from unspecified customers and they are respectively connected automatically to telephone sets allocated to operators, the stored program being readable by a computer and causing the computer to execute a process comprising:

acquiring calling subscriber information of the received call of the customer;

storing customer information about said customer in a first storage unit, the customer information including at least the calling subscriber information;

deciding if the acquired calling subscriber information exists among such customer information stored in the first storage unit, when the customer's call has been received;

storing in a second storage unit operator serving history information corresponding to the calling subscriber information, the operator serving history information including identification information of at least one of an operator who served the customer for maximum cumulative time period among all the operators, an operator who took charge of transactions with the customer most often among all the operators and an operator who took charge of most recent transactions with the customer;

searching the second storage unit for identification information of operators corresponding to said calling subscriber information of the received customer's call, and connecting said customer's call to the telephone set allocated to said operators searched, in a case where said deciding decides that the calling subscriber information of said received customer's call exists in said first storage unit, wherein when the identification information of at least two operators have been searched, one of said at least two operators is selected, and the identification information of the selected operator is used for the call connection.

12. A storage medium storing therein a program as defined in claim 11, wherein the stored program being readable by said computer and causing said computer to further execute:

connecting said received customer's call to the telephone set allocated to one of the operators selected in accordance with any desired criterion, in a case where said calling subscriber information of said received customer's call has been decided to be nonexistent in said first storage unit at said decision step.

13. An operator connection system receiving telephone calls from unspecified customers and connecting the telephone calls to operators, comprising:

a decision unit deciding if a calling customer has ever called;

an operator search unit searching at least one operator who has ever served the calling customer based on an operator serving history comprising an identification of an operator who served the calling customer, a date an operator served the calling customer, a number of times an operator has served the calling customer and duration of each call when an operator served the calling customer, when said decision unit decides that the calling customer has called;

a classification unit classifying the searched operators according to at least one of a designation by the calling customer, the date an operator served the calling customer, the number of times an operator has served the calling customer and the duration of each call when the operator served the calling customer, as the operator serving history; and a call connection unit connecting the customer's call to one of the operators based on the classification by said classification unit.

14. An operator connection system receiving telephone calls from unspecified customers and connecting the telephone calls to operators, comprising:

a decision unit deciding if a calling customer has called before; and a call connection unit connecting the customer's call to one of the operators who are classified based on a serving history information of the operators associated with the customer when the calling customer has called before, wherein the operator classification includes at least one of an operator who is designated by the customer, an operator who served the customer for the maximum cumulative time period among all the operators, an operator who took charge of transactions with the customer most often among all the operators and an operator who took charge of the last transactions with the customer.

15. An operator connection method receiving telephone calls from unspecified customers and connecting the telephone calls to operators, comprising:

deciding whether a calling customer has ever called;

searching for at least one operator who have ever served the calling customer when the calling customer has called;

classifying each searched operator according to at least one of a designation by the calling customer, a date an operator served the calling customer, a number of times an operator has served the calling customer and duration of each call when an operator served the calling customer; and connecting the customer's call to one of the operators based on the classification.

* * * * *